No. 610,895. Patented Sept. 20, 1898.
F. E. CASE.
CONTROLLER FOR ELECTRIC MOTORS.
(Application filed Apr. 2, 1898.)
(No Model.) 2 Sheets—Sheet 2.
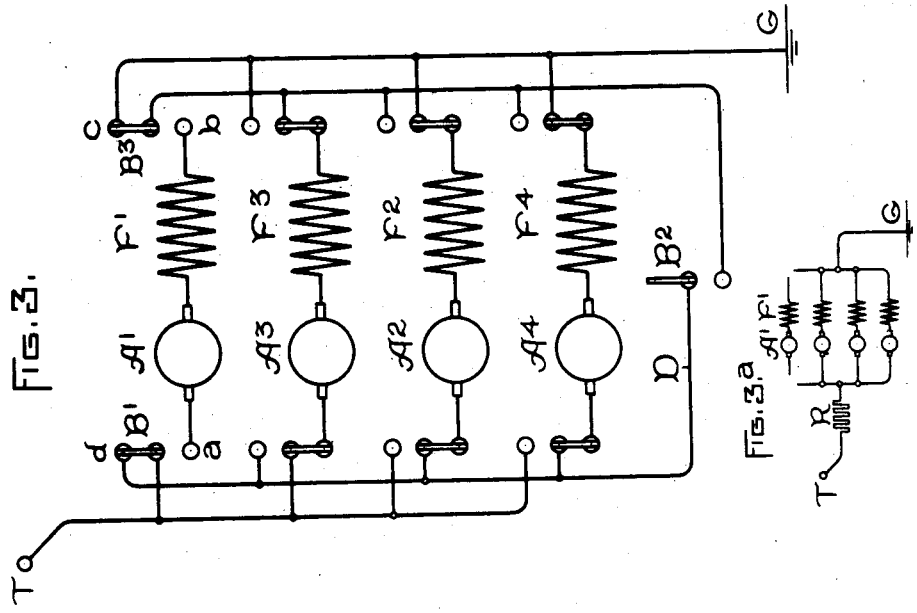
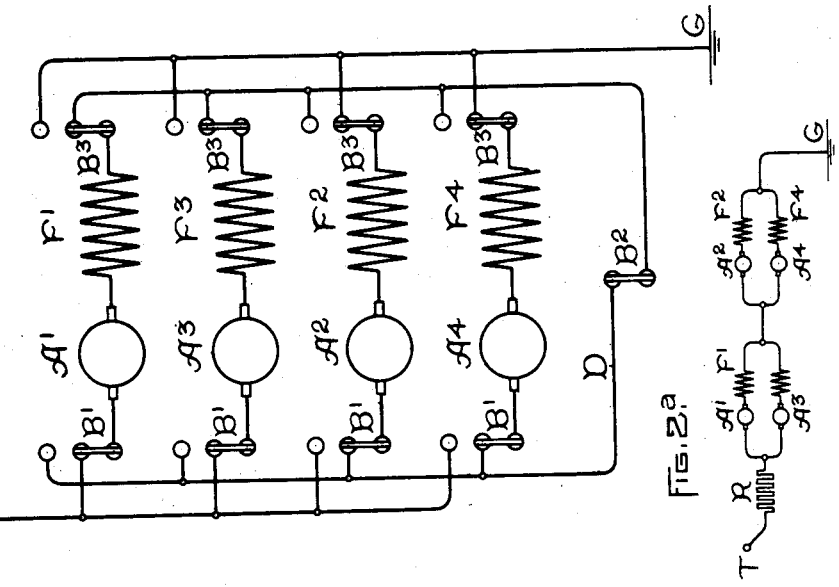
WITNESSES.
A. H. Abell.
R. F. Macdonald.
INVENTOR:
Frank E. Case,
by Albert G. Davis
Atty.

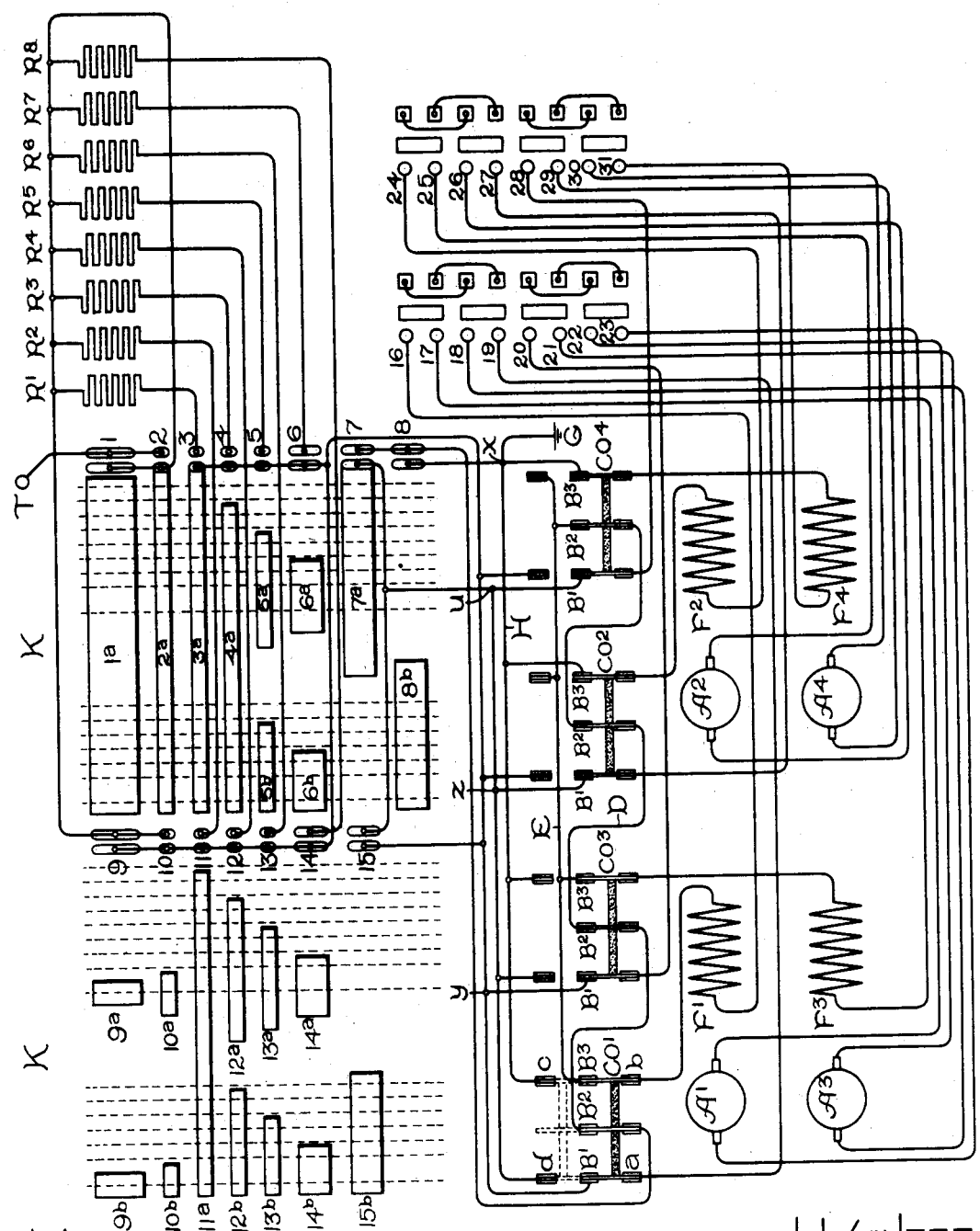

UNITED STATES PATENT OFFICE.

FRANK E. CASE, OF SCHENECTADY, NEW YORK, ASSIGNOR TO THE GENERAL ELECTRIC COMPANY, OF NEW YORK.

CONTROLLER FOR ELECTRIC MOTORS.

SPECIFICATION forming part of Letters Patent No. 610,895, dated September 20, 1898.

Application filed April 2, 1898. Serial No. 676,154. (No model.)

*To all whom it may concern:*

Be it known that I, FRANK E. CASE, a citizen of the United States, residing at Schenectady, in the county of Schenectady, State of New York, have invented certain new and useful Improvements in Controllers for Electric Motors, (Case No. 563,) of which the following is a specification.

My invention relates to controllers for electric motors.

It has for its object to avoid a difficulty which sometimes arises with controllers governing a number of motors, usually propelling a car or train, which may be grouped in different combinations in series or parallel for the purpose of changing the speed and torque in well-known ways. With all such devices it is important to provide cut-out switches by which any particular motor may be taken out of circuit in case of accident. To cut out a particular motor, however, may under some circumstances make it difficult or impracticable to regulate the remaining motors by the series-parallel method. To avoid this difficulty, it has been proposed to operate the motors in pairs which are treated as units. Assuming, for instance, that there were two pairs of motors, the pairs would be coupled in series, so that the motors would really be in series-parallel combination and later they would be connected in parallel. With this arrangement when one motor was cut out the connections were so arranged that a corresponding motor of the other pair would also be cut out, thus, in the case assumed, dividing the propelling power by two and perhaps overloading the remaining motors. In modern developments it is desirable to keep all the motors in service as far as possible, so as to quickly accelerate the car or train, particularly in high-speed interurban, suburban, or trunk-line service. Practically it is necessary to keep in circuit every motor possible. This, however, with the motors arranged in pairs in the way pointed out, renders it impracticable to regulate them by the series-parallel method, as the groups would be thrown out of balance. I have therefore so arranged the apparatus which I employ that whenever the cut-out switch of any one motor is thrown to disconnect it from the line the connections are so changed that all the remaining motors will be connected in parallel and will be regulated by resistance control.

I have illustrated in the accompanying drawings a controller, with its connections, by which the result indicated may be attained. The controller is adapted for four motors; but it is within my invention to use more than this number. They may, as already pointed out, drive the different axles of a truck, car, or train, or they may be connected in any way to a common load or be simultaneously running in any relation and for any reason. The necessary changes to adapt the apparatus to other numbers of motors will be readily understood.

In the drawings, Figure 1 is a development of a controller with the motors shown diagrammatically and cut-out switches for each motor, a reversing-switch being also provided, as is customary. Fig. 2 shows the groupings of the motors in the series position of the controller, Fig. $2^a$ showing the grouping conventionally. Fig. 3 shows the arrangement with one motor cut out, Fig. $3^a$ showing the grouping arranged in the simplest form.

In Fig. 1 the controller-contacts are developed in plane at K K. It is to be understood that a cylindrical switch is used, with contacts on opposite sides of the cylinder, and two rows of brushes, numbered, respectively, from 1 to 8 and from 9 to 15. The various contacts of the controller are correspondingly numbered $1^a$, &c. Resistances $R'$ to $R^8$ are also indicated, which are connected in multiple, so that as each resistance is cut in the current-carrying capacity will be increased, as is customary in controlling devices where motors taking large current are employed. Motors $A'$ $A^3$ are connected as one pair and $A^2$ $A^4$ as another, the preferred arrangement being that one motor of each group shall be on different trucks of the train or car, so that as many trucks as possible shall be kept available in case of accident, so as to obtain maximum traction. The motor armatures and fields are represented at $A'$, $F'$, &c. Cut-out switches $CO'$ to $CO^4$ are also indicated. These are three-blade switches, the third blade of which opens or closes a connection D for a purpose presently pointed out. By throwing one of the switches its corresponding motor is cut out at both ends, so that it may be handled without danger. In the first position of the controller one of the resistances R is in circuit and the motors are coupled in pairs, the pairs being in series. This is the arrangement shown in Figs. 2 and $2^a$. As the controller is rotated additional resistances are included until when contacts 9 10 reach the respective contacts $9^a$ $10^a$ a short circuit is thrown around the resistances, so that the motors act in series multiple without resistance. When the contact 8 touches contact $8^b$, it will be found that a shunt is thrown around the second pair of motors, which are then momentarily disconnected as the contact 7 passes off the contact $7^a$ and finally reconnected in multiple with the first pair when contact 15 touches contact $15^b$, this being a well-known way of effecting the change from series to multiple. It will be perceived that the part of the switch shown on the left makes its contacts immediately after they are made on the part of the switch shown on the right. For instance, contact 3 first touches the contact $3^a$ and immediately afterward contact 11 touches contact $11^a$, then contacts 4 and 12, and so on. This arrangement separates contacts carrying current, so that the circuit is not broken at adjacent ones, thus preventing short-circuiting, which such large currents might occasion. The heavy contacts at the top of the controller are for carrying full current direct from the trolley, and the next adjacent contacts $10^a$ $2^a$, &c., are arranged to break the circuit after it is broken on the larger contacts and after resistance, greater or less, as may be required, is inserted. In general resistances are used whenever the circuit connections are to be shifted or minor speed changes made, as is now well understood in the art.

The circuit in the first position of the controller, with the cut-out switches in the position shown, is as follows: Starting from the trolley T, representing any connection with a suitable source of current, contact 2 first touches contact $2^a$, thus bridging the gap between its two parts. Current then flows to all of the resistances; but as contact 3 is the only resistance-terminal the circuit of which is completed it can pass only through the first section R' of resistance. It passes from there by the cross connection shown to the blade B' of the cut-out switch CO', thence to contact 19 on the reversing-switch, to contact 18, to armature A', to contact 17, contact 16, through field F', across the blade $B^3$ of the switch CO', to the lead E. From the trolley-lead, before it reaches the cut-out switch CO', a tap passes from the point $y$ across the blade B' of the cut-out switch $CO^3$ to contact 20 upon the reversing-switch, contact 21, to armature $A^3$, contact 22, contact 23, through field $F^3$, across the blade $B^3$ of the cut-out switch $CO^3$, to the lead E, thence across the blade $B^2$ of the cut-out switch $CO^4$, and by the lead D back to the controller, to contact 7, and from this contact the connection passes to the blades B' on the respective cut-out switches $CO^2$ and $CO^4$. From the switch $CO^2$ the circuit leads to contact 27 on the reversing-switch, contact 26, through armature $A^2$, contact 25, contact 24, through field $F^2$, to the lead H. From the switch $CO^4$ the circuit is to contact 28 on the reversing-switch, contact 29, through armature $A^4$, contact 30, contact 31, through field $F^4$, and thus to the lead H at the point $x$. The lead H is grounded at G, being the ordinary "ground-wire" of the controller. This is the combination shown in Figs. 2 and $2^a$, except that of course the resistance is included and is cut in or out by the revolution of the controller in the usual way. It is unnecessary to trace the other circuits.

Let us now assume that cut-out switch CO' is thrown to the dotted-line position. This will open the circuit of the lead D and will take the blades B' $B^3$ of the switch from the contacts $a$ $b$ and place them in the contacts $d$ $c$. This will be the combination shown in Fig. 3 and still more simply in Fig. $3^a$. Starting, as before, at the trolley and passing to contact 3 through the resistance R', current then passes down to the point $y$, as before, across blade B' of the switch $CO^3$, through contacts 20 and 21 on the reversing-switch, to the armature $A^3$, contacts 22 and 23, through the field $F^3$, across blade $B^3$ of the cut-out switch $CO^3$, thence to the left, to the contact $c$ on the cut-out switch CO', (the blade $B^3$ of that switch being now in its dotted-line position,) and thence to the conductor H and to ground. Returning to the point $y$, current passes to the left and so by the blade B' on the switch CO' to contact $d$, thence to the point $z$, passing across the blade B' of the cut-out switch $CO^2$, contacts 27 and 26, through armature $A^2$, contacts 25 and 24, through the field $F^2$, across blade $B^3$ of the cut-out switch $CO^2$, to conductor H, and to ground. From $z$ current passes to the left to the point $u$, thence through the switch $CO^4$ at the blade B', contacts 28 and 29, armature $A^4$, contacts 30 and 31, field $F^4$, across the blade $B^3$ of switch $CO^4$, conductor H and to ground. The office of the middle blade in each of the cut-out switches is to open the conductor D. It will be found by inspection that if any one of these switches be thrown to the dotted-line position, like the switch CO', the others of course remaining closed, a similar set of connections to that just described will be made, so that any one of the motors will by its corresponding cut-out switch be open-circuited at both ends, and the other three motors shown will be connected in parallel. Similarly, if any two of the motors be cut out the remaining two will be connected in parallel, while if three should be cut out the controller would operate as a resistance-controller to regulate the remaining motor. It is unnecessary to trace the circuits for the several combinations, as they will be readily apparent.

I consider any arrangement of cut-out switches which will act to so change the connections of a number of motors that those not cut out will be coupled only in parallel by throwing the cut-outs, whereas before they could be run both in series and parallel, within the scope of my present invention. The switches may embrace in a single piece of apparatus the necessary contacts, fixed and movable, as in Fig. 1, or two or more switches may be used, as in Figs. 2 and 3. Changes in design or arrangement would not affect the essence of the invention.

What I claim as new, and desire to secure by Letters Patent of the United States, is—

1. The combination of four or more electric motors, a switch for operating the motors in series or parallel as may be desired, and cut-out switches, one for each motor; the combination of contacts and connections being such that when the cut-out switch for any motor is operated, the remaining motors will be operated only in parallel.

2. The combination of a number of motors, a switch for operating the motors in pairs in series or in parallel and for cutting in or out resistances in any desired manner in effecting the changes in speed or connection, and a cut-out switch for each motor; the contacts and connections being so arranged that when any of the cut-out switches is operated, the remaining motors will be connected only in parallel and be regulated by the resistance-steps of the controller.

3. The combination of a number of motors driving a common load, a switch for operating the motors in series or in parallel as desired, cut-out switches for each motor, and contacts and connection arranged to be so changed by throwing any cut-out switch that the motors not cut out are operated only in parallel.

4. The combination of a number of motors operatively connected to the axles of a truck, car or train, a controlling device operating the motors in pairs in series or in parallel, and cutting in or out suitable resistance in effecting changes of speed, with cut-out switches, one for each motor, the contacts and connections of which are arranged to throw the remaining motors in parallel with each other and in series with the resistance upon the operation of any of the cut-out switches.

5. In a controllor for electric motors operated in pairs in series and parallel, three-blade cut-out switches for each motor, two of the blades of which shift the motor connections, and the third blade of which opens a connection common to all the switches, as described.

6. In a controller for electric motors operating them in pairs in series or in parallel, three-blade cut-out switches for each motor, the outer blades of which shift the motor connections so that the motor corresponding to any switch operated is cut out at both ends, and the remaining motors are connected in parallel, and the middle blade of which opens a connection common to all the switches.

In witness whereof I have hereunto set my hand this 31st day of March, 1898.

FRANK E. CASE.

Witnesses:
 B. B. HULL,
 G. HAYNES.